(12) United States Patent
Erwin et al.

(10) Patent No.: US 11,144,070 B1
(45) Date of Patent: Oct. 12, 2021

(54) SHORT TAKE OFF AND LAND AIRCRAFT

(71) Applicants:Chip West Erwin, Brandon, FL (US); Marinus Bernard Bosma, Tipp City, OH (US)

(72) Inventors: Chip West Erwin, Brandon, FL (US); Marinus Bernard Bosma, Tipp City, OH (US)

( * ) Notice: Subject to any disclaimer, the term of this patent is extended or adjusted under 35 U.S.C. 154(b) by 0 days.

(21) Appl. No.: 16/941,420

(22) Filed: Jul. 28, 2020

(51) Int. Cl.
| | |
|---|---|
| *G05D 1/04* | (2006.01) |
| *B64C 9/20* | (2006.01) |
| *B64C 3/54* | (2006.01) |
| *B64C 13/02* | (2006.01) |
| *B64C 13/38* | (2006.01) |
| *B64C 21/04* | (2006.01) |
| *B64D 31/00* | (2006.01) |
| *B64C 11/28* | (2006.01) |
| *B64C 11/46* | (2006.01) |
| *B64D 27/02* | (2006.01) |
| *B60L 50/60* | (2019.01) |

(Continued)

(52) U.S. Cl.
CPC ............. *G05D 1/042* (2013.01); *B60L 50/60* (2019.02); *B64C 3/54* (2013.01); *B64C 9/20* (2013.01); *B64C 11/28* (2013.01); *B64C 11/46* (2013.01); *B64C 13/02* (2013.01); *B64C 13/38* (2013.01); *B64C 21/04* (2013.01); *B64D 27/02* (2013.01); *B64D 27/24* (2013.01); *B64D 31/00* (2013.01); *B60L 2200/10* (2013.01); *B64C 2009/005* (2013.01)

(58) Field of Classification Search
CPC ........... B64C 9/32; B64C 9/323; B64C 9/326; B64C 9/34; B64C 3/42; B64C 3/44; B64C 3/50; B64C 9/00; B64C 2009/005; B64C 21/00; B64C 21/02; B64C 21/04; B64C 21/08; B64C 23/00; B64C 11/001; B64C 11/46; B64C 13/0425; B64C 3/14; B64C 2003/142; B64C 2003/145; B64C 2003/146; B64C 2003/147; B64C 2003/148; B64D 27/02; B64D 27/06; B64D 27/24; B64D 2027/026; B64D 29/02
See application file for complete search history.

(56) References Cited

U.S. PATENT DOCUMENTS 9,187,175 B1 *  11/2015 Chen ................. B64C 39/08
10,787,254 B1 *   9/2020 Chen ................. B64D 35/02
(Continued)

*Primary Examiner* — Joshua J Michener
*Assistant Examiner* — Cindi M Curry
(74) *Attorney, Agent, or Firm* — Lamon Patent Services; Cynthia S. Lamon

(57) ABSTRACT

A flap assembly for a fixed wing aircraft, comprising first and second flap portions, a compartments in the flap portions enclosing rechargeable batteries, motor controllers and electric motors, vertically-oriented slots in the first flap portion with propellers operable through a sidewall of the slot, such that the propeller in operation extends both over and under the top and bottom walls of the flap portion. With the flap assembly retracted in the wing the propeller is entirely enclosed in the length of the slot, and wherein the flap assembly is extended from the edge of the wing, enhancing area and curvature of the wing, increasing lift on the wing, exposing the slot, and with the slot exposed the motor is started spinning the propeller, providing increased airflow over the flap assembly, further increasing lift on the wing.

11 Claims, 8 Drawing Sheets

(51) Int. Cl.
*B64D 27/24* (2006.01)
*B64C 9/00* (2006.01)

(56) References Cited

U.S. PATENT DOCUMENTS

2020/0055596 A1* 2/2020 Millhouse ............ B64C 29/0025
2020/0406775 A1* 12/2020 Siegmeth ............... B64D 27/24

* cited by examiner

SHORT TAKE OFF AND LAND AIRCRAFT

BACKGROUND OF THE INVENTION

1. Field of the Invention

The present invention is in the technology area of fixed wing aircraft and pertains more particularly to ability of such aircraft to take off and land on short runways.

2. Description of Related Art

The technology of Short Take Off and Landing (STOL) for fixed wing aircraft is well known in the art, and there are numerous examples in general literature and in patent literature. The length of runway for such aircraft to take off and land varies among different designs and models of aircraft, and the technology enabling STOL also varies.

STOL is typically defined as an ability of an aircraft to clear a 50-foot (15 meters) obstacle within 1,500 feet (450 meters) of commencing takeoff or in landing, to stop within 1,500 feet (450 meters) after passing over a 50-foot (15 meters) obstacle.

There are various reasons for providing aircraft capable of STOL, such as reduced cost for runway building and maintenance. In military applications STOL aircraft can use very short runways that are relatively easy to build and maintain in forward positions and in combat situations. Helicopters have long been available to land and take off from reduced areas, such as helipads on rooftops, but helicopters have an offsetting disadvantage of being slower in horizontal flight and expensive to operate.

At the time of filing this patent application the planet is in the middle of a pandemic called the Covid-19 virus pandemic. People are at risk in third-world regions where airports with long runways are few, so evacuating effected persons to hospital, for example, is a challenge, and great efforts are also underway to develop vaccines and other effective treatments for Covid-19. When a vaccine is available and manufactured in quantity there will be a pressing need for delivering quantities of vaccine to remote areas to inoculate people. The present state of STOL fixed wing aircraft may be an advantage in delivering vaccine and medications in the pandemic, but what is clearly needed is a STOL fixed wing aircraft that can take off and land in much shorter distances that can aircraft in the art at the time of filing this patent application.

BRIEF SUMMARY OF THE INVENTION

In one embodiment of the invention an enhanced flap assembly for a fixed wing aircraft is provided, comprising a first and a second flap portion rotationally connected and guided on a track, the flap assembly extendable and retractable from an edge of a wing of the aircraft by a remotely operable drive mechanism, increasing and decreasing surface area and altering effective shape of the wing, a first compartment in a first of the flap portions between a top and a bottom wall of the first flap portion, enclosing a first rechargeable battery, a first motor controller and a first electric motor, a vertically-oriented slot in the first flap portion, the slot having a length substantially greater than a thickness of the flap portion, with a propeller operable in the slot on a shaft from the electric motor through a sidewall of the slot, such that the propeller in operation extends both over and under the top and bottom walls of the flap portion. With the flap assembly retracted in the wing the propeller is entirely enclosed in the length of the slot, and wherein the flap assembly is extended from the edge of the wing, enhancing area and curvature of the wing, increasing lift on the wing, exposing the slot, and with the slot exposed the motor is started spinning the propeller, providing increased airflow over the flap assembly, further increasing lift on the wing.

In one embodiment the flap assembly further comprises remotely operable covers over openings of the slot in the top and bottom wall of the first flap portion. Also, in one embodiment the flap assembly further comprises a plurality of slots in the first flap portion in a direction of a length of the wing, each having a propeller driven by an electric motor through a sidewall of the slot, and a proximal compartment enclosing the electric motor and a motor drive and rechargeable battery for driving the electric motor. In one embodiment operable elements are controlled by a central controller in accordance with executable code responding to sensors for at least airspeed. And in one embodiment the flap assembly further comprises a second compartment in a second of the flap portions, the second portion being a portion furthest extended when the flap assembly is extended, the second compartment enclosing a second rechargeable battery, a second motor controller and a second electric motor, the second electric motor driving a propeller shaft directed outward from a trailing edge of the second flap portion, the propeller shaft turning a foldable propeller providing thrust in the direction of extension of the second flap portion. In one embodiment operable elements are controlled by a central controller in accordance with executable code responding to sensors for at least airspeed.

In another aspect of the invention an enhanced aileron system for a fixed wing aircraft is provided, comprising a first aileron implemented at an outboard end of a first wing of the aircraft, a compartment in the first wing enclosing a rechargeable battery, a motor controller and an electric motor, a vertically oriented first slot having a length in the direction of a length of the first wing, the first slot opening through a top and a bottom wall of the first wing, and proximate the first aileron, a propeller rotatable in the first slot on a shaft through a sidewall of the first slot from the electric motor. A force exerted on the first wing for accomplishing rolling motion of the aircraft is increased by driving the propeller in the slot forcing air over the aileron at a higher speed than the airspeed of the aircraft.

In one embodiment the enhanced aileron system further comprises a second aileron implemented at an outboard end of a second wing of the aircraft, opposite the first wing, a compartment in the second wing enclosing a rechargeable battery, a motor controller and an electric motor, a vertically oriented second slot having a length in the direction of a length of the second wing, the second slot opening through a top and a bottom wall of the second wing, and proximate the second aileron, a propeller rotatable in the second slot on a shaft through a sidewall of the second slot from the electric motor. Force exerted on the second wing for accomplishing rolling motion of the aircraft is increased by driving the propeller in the second slot forcing air over the second aileron at a higher speed than the airspeed of the aircraft. And in one embodiment the operable elements are controlled by a central controller in accordance with executable code responding to sensors for at least airspeed.

In another aspect of the invention a short take-off and landing (STOL) aircraft is provided, comprising a primary engine for forward thrust, an enhanced flap assembly in each wing of the fixed wing aircraft, each flap assembly having a first and a second flap portion rotationally connected and guided on a track, extendable and retractable from an edge of a wing of the aircraft by a remotely operable drive mechanism, the flap assemblies increasing and decreasing surface area and altering shape of the wings, each assembly further having a compartment between a top and a bottom wall of the first flap portion, enclosing a rechargeable battery, a motor controller and an electric motor, and a vertically-oriented slot in the first flap portion, the slot having a length substantially greater than a thickness of the flap portion, with a propeller operable in the slot on a shaft from the electric motor through a sidewall of the slot, such that the propeller in operation extends both over and under the top and bottom walls of the flap portion, an enhanced aileron system having a first aileron implemented at an outboard end of a first wing of the aircraft, and a second aileron implemented at an outboard end of a second wing of the aircraft, a compartment in each wing enclosing a rechargeable battery, a motor controller and an electric motor, a vertically oriented slot in each wing having a length in the direction of a length of the wing, the slot opening through a top and a bottom wall of the wing, and proximate the aileron, a propeller rotatable in each wing on a shaft from the electric motor through a sidewall of the slot, and a digital control system comprising a processor tracking airspeed and attitude of the aircraft through sensors, and executing coded instructions, the control system managing starting and stopping propellers in the slots in both of the enhanced flap system and the enhanced aileron system according to at least airspeed.

In one embodiment the STOL aircraft further comprises a second compartment in a second of the flap portions, the second portion being a portion furthest extended when the flap assembly is extended, the second compartment enclosing a second rechargeable battery, a second motor controller and a second electric motor, the second electric motor driving a propeller shaft directed outward from a trailing edge of the second flap portion, the propeller shaft turning a foldable propeller providing thrust in the direction of extension of the second flap portion. In one embodiment the digital control system executes coded instructions controlling a landing sequence, extending the flaps at a first sensed airspeed, activating the propellers in the flap system at a second sensed airspeed, and activating the propellers in the enhanced aileron system at a third sensed airspeed. In one embodiment the digital control system further senses touchdown in the landing sequence and activates a braking system in the aircraft on touchdown. And in one embodiment the braking system comprises one or both of reversing thrust of the propellers in the enhanced flap system, the propellers in the enhanced aileron system, and a propeller of a primary engine of the aircraft.

In one embodiment the braking system comprises one or both of reversing thrust of the propellers in the enhanced flap system, the propellers in the enhanced aileron system, and a propeller of a primary engine of the aircraft. In one embodiment the STOL aircraft further comprises remotely operable covers on the slots of both the enhanced flap system and the enhanced aileron system, wherein the digital control system opens and closes the covers as needed in managing operation of propellers.

In one embodiment of the STOL aircraft the digital control system executes coded instructions controlling a takeoff sequence, beginning with brakes locked, running up the primary engine to maximum thrust, extending the flaps of the enhanced flap system, activating the propellers in the flaps increasing forward thrust and adding lift, activating the propellers in the enhanced aileron system adding thrust and enhancing attitude control, releasing the brakes, sensing airspeed during takeoff roll, sensing liftoff, and sensing altitude and airspeed after liftoff, deactivating propellers in the enhanced flap system and enhanced aileron system at some combination of altitude and airspeed, and retracting the flaps, attaining a cruising altitude and airspeed.

In one embodiment of the STOL aircraft the digital control system executes coded instructions controlling a landing sequence, beginning with the aircraft lined up for landing and decreasing airspeed, extending the flaps at an airspeed before stall is sensed, activating the propellers in the flaps adding lift, activating the propellers in the enhanced aileron system enhancing attitude control, sensing touchdown, activating mechanical brakes after touchdown, reversing thrust by one or all of propellers of the primary engine, the enhanced flap system and the enhanced aileron system, decreasing ground speed to final stop.

In another aspect of the invention a method for short take off for a fixed wing aircraft having a primary engine for forward thrust is provided, comprising setting brakes at a starting point for a takeoff roll, running up a primary engine to maximum thrust, extending flaps of an enhanced flap system, activating propellers driven by electric motors in slots in a flap portion of the enhanced flap system, providing increased volume and speed of air over the flaps, increasing lift, activating propellers driven by electric motors in slots in an enhanced aileron system, enhancing attitude control, releasing the brakes, beginning a takeoff roll, sensing airspeed during the takeoff roll, sensing liftoff, sensing altitude and airspeed after liftoff, deactivating the propellers in the enhanced flap system and enhanced aileron system at some combination of altitude and airspeed, and retracting the flaps, attaining a cruising altitude and airspeed.

In another aspect of the invention a method for short landing for a fixed wing aircraft having a primary engine for forward thrust is provided, comprising lining up the aircraft for landing and decreasing airspeed, extending flaps of an enhanced flap system at an airspeed before stall is sensed, activating propellers driven by electric motors flap portions of the enhanced flap system, the propellers providing increased volume and speed of air over the flaps, increasing lift, activating propellers driven by electric motors in slots in an enhanced aileron system enhancing attitude control, sensing touchdown, activating mechanical brakes after touchdown and reversing thrust by one or all of propellers of the primary engine, the enhanced flap system and the enhanced aileron system, decreasing ground speed to final stop.

DETAILED DESCRIPTION OF THE INVENTION

Figure 1:
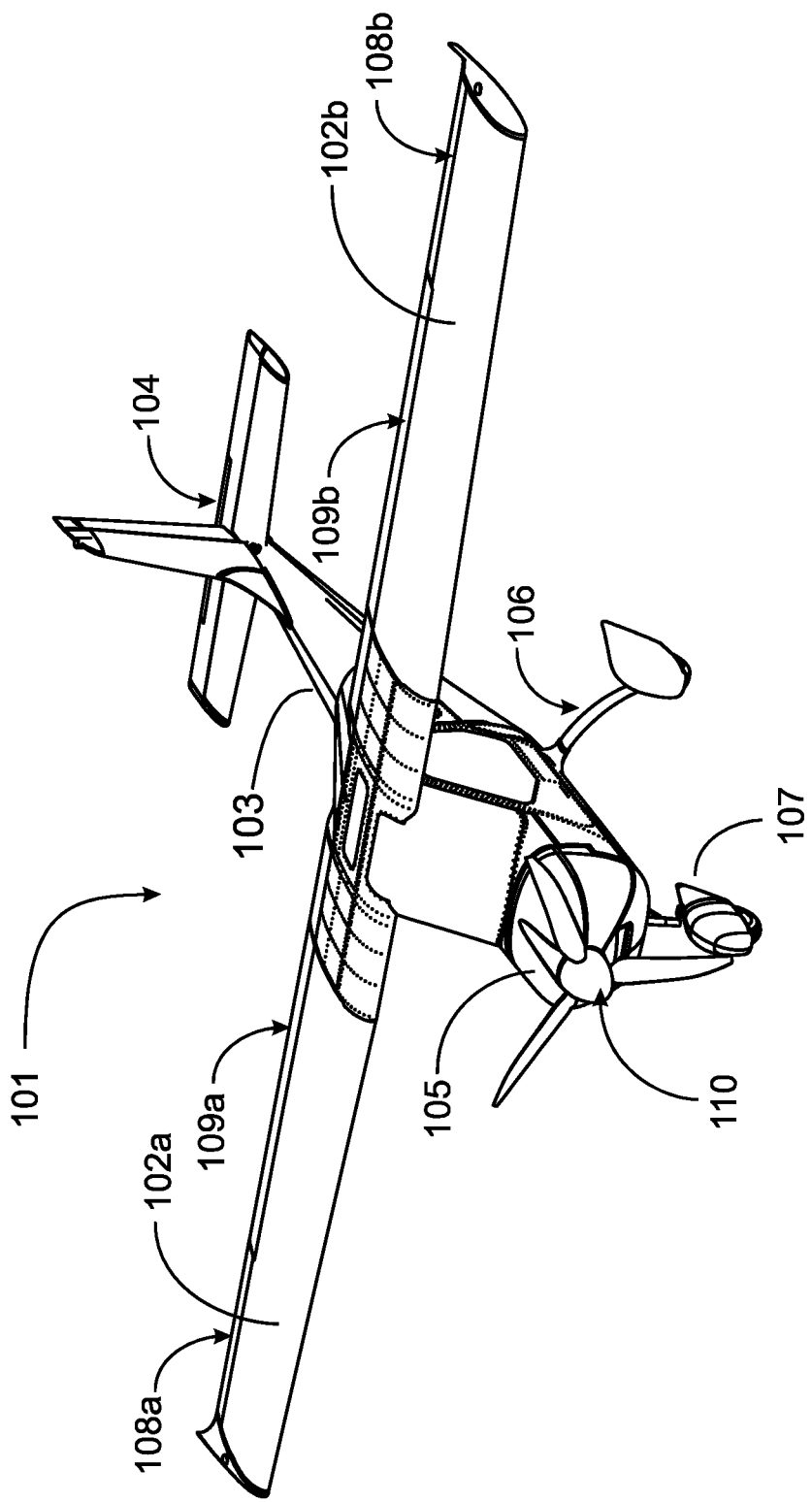
FIG. 1 is a perspective illustration of a STOL fixed-wing aircraft in an embodiment of the present invention.

FIG. 1 is a perspective illustration of a STOL fixed-wing aircraft 101 in an embodiment of the present invention. In this example the aircraft is a fixed wing aircraft with a single engine 105 driving a propeller 110, located at the front of the aircraft. Aircraft 101 has a fuselage 103 a tail section 104 including a rudder, two fixed wings 102a and 102b landing gear 106 including a nose wheel 107, aileron apparatus 108a and 108b, and flap apparatus 109a and 109b. Propeller 110 in some embodiments may be reversible to provide braking on landing, and may be blades adjustable for thrust, as is known in the art.

Aileron apparatus 108a and b are implemented near the outboard ends of wings 102a and 102b. The use of the ailerons is well-known in the art for generating a rolling motion for the aircraft, which may precipitate a banking turn. Aileron control is critical in takeoff and landing, particularly in landing the aircraft. Ailerons usually work in opposition: as the right aileron is deflected upward, the left is deflected downward, and vice versa. In embodiments of the invention aileron apparatus 108a and 108b comprise additional elements enhancing operation of the conventional aileron functions. These elements and operation are described in enabling detail below.

Flap apparatus 109a and 109b implemented in wings 102a and 102b are well-known as apparatus for increasing lift. Flaps extension is particularly important in takeoff and landing as well and is critical in operation of an aircraft intended for short takeoff and landing (STOL). Both the aileron apparatus and the flap apparatus are enhanced in a unique way in some embodiments of the present invention, and detail of enhancements is provided below in enabling fashion.

Figure 2:
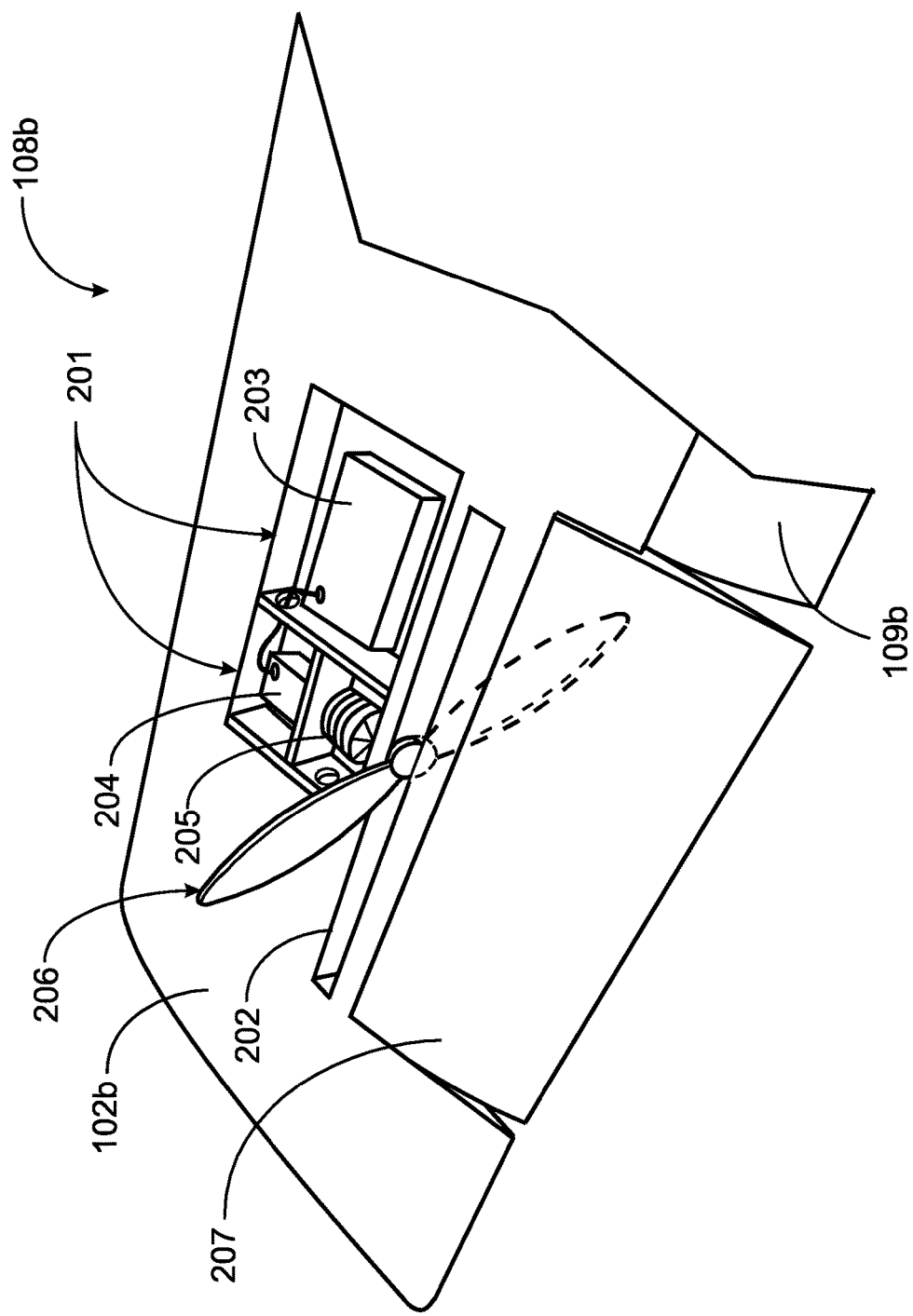
FIG. 2 is a perspective view of an aileron apparatus of the aircraft of FIG. 1 in an embodiment of the invention.

FIG. 2 is a perspective view of aileron apparatus 108b of aircraft 101 in an embodiment of the invention. The overall aileron apparatus comprises several elements and functions not common to conventional aileron apparatus and function. In this example compartments 201 are implemented in wing 102b to house one or more rechargeable batteries 203, a motor controller 204, and an electric motor 205. This motor in one embodiment is a brushless DC motor which has an advantage of being controllable to start and stop the motor in particular positions, making it feasible to stop the motor with blades of a two-blade propeller enclosed in a slot in a wing or a flap portion. Brushless DC motors are not, however, required in embodiments of the invention, and indeed, in some embodiments motors of other power sources may also be used. A slot 202 of a length and width to accommodate a propeller 206 is implemented through wing 102b. In this example propeller 206 is a propeller having two blades extending in opposite directions, such that the propeller, stopped in a horizontal aspect, may be enclosed in slot 202. In FIG. 2 the propeller is shown in a rotary aspect that blades of the propeller are extending from the slot. Propeller 206 may be in one embodiment a propeller with a single blade, counterbalanced to avoid excessive vibration. The propeller is driven by motor 205 on a drive shaft passing through a sidewall of slot 202. Propeller 206, spinning, may provide airflow over aileron 207 at any condition of airspeed of the aircraft, even with the aircraft at a standstill, and therefor provide force to affect attitude of the aircraft. The propeller provides airflow over and under the aileron.

The electric motor, if a brushless DC motor, is controllable to stop propeller 206 with the propeller horizontal and contained wholly within slot 202, such that when not being used the propeller offers no resistance to flight of aircraft 101.

As is known in the art, aileron 207 is used for generating a rolling motion for the aircraft, which may precipitate a banking turn. Typically, when one aileron is moved downward the opposite aileron is moved upward. For a purpose of the present invention which is to take off and land in a bare minimum distance, reducing the velocity of the aircraft to a bare minimum just before touchdown is a requirement. At some point in the reduction of velocity, before landing velocity is attained, effect of the ailerons is lost, as the air velocity over the ailerons is too slow to provide sufficient cantilever force on the wing to provide control.

In a landing protocol in an embodiment of the present invention a slot cover (not shown in FIG. 2) over slot 202 is opened and motor controller 204 is commanded to activate motor 205 to drive propeller 206 at a time in the landing process that the velocity of the aircraft has not yet reduced to the velocity where control by the ailerons is lost. Slot covers are shown and described below with reference to FIG. 4. Brushless motor 205 driving propeller 206 provides sufficient air volume and velocity over the aileron so force and torque are adequate to maintain control all the way to touchdown. For example, in one circumstance the landing velocity may be 20 knots, while aileron control may be lost at forty knots. Use of auxiliary propeller 206 forcing air directly over aileron 108b may provide an apparent airspeed of more than forty knots over the aileron 108b while the actual airspeed of the airplane is reduced to 20 knots at landing.

FIG. 2 illustrates apparatus and operation for aileron 108b, but it is to be understood that a second auxiliary propeller system like that described with reference to FIG. 2 is also implemented at the outboard end of wing 102a for aileron 108a. Both ailerons are enhanced in takeoff and landing with auxiliary propellers and are controlled in tandem as is described in enabling detail below.

Figure 3:
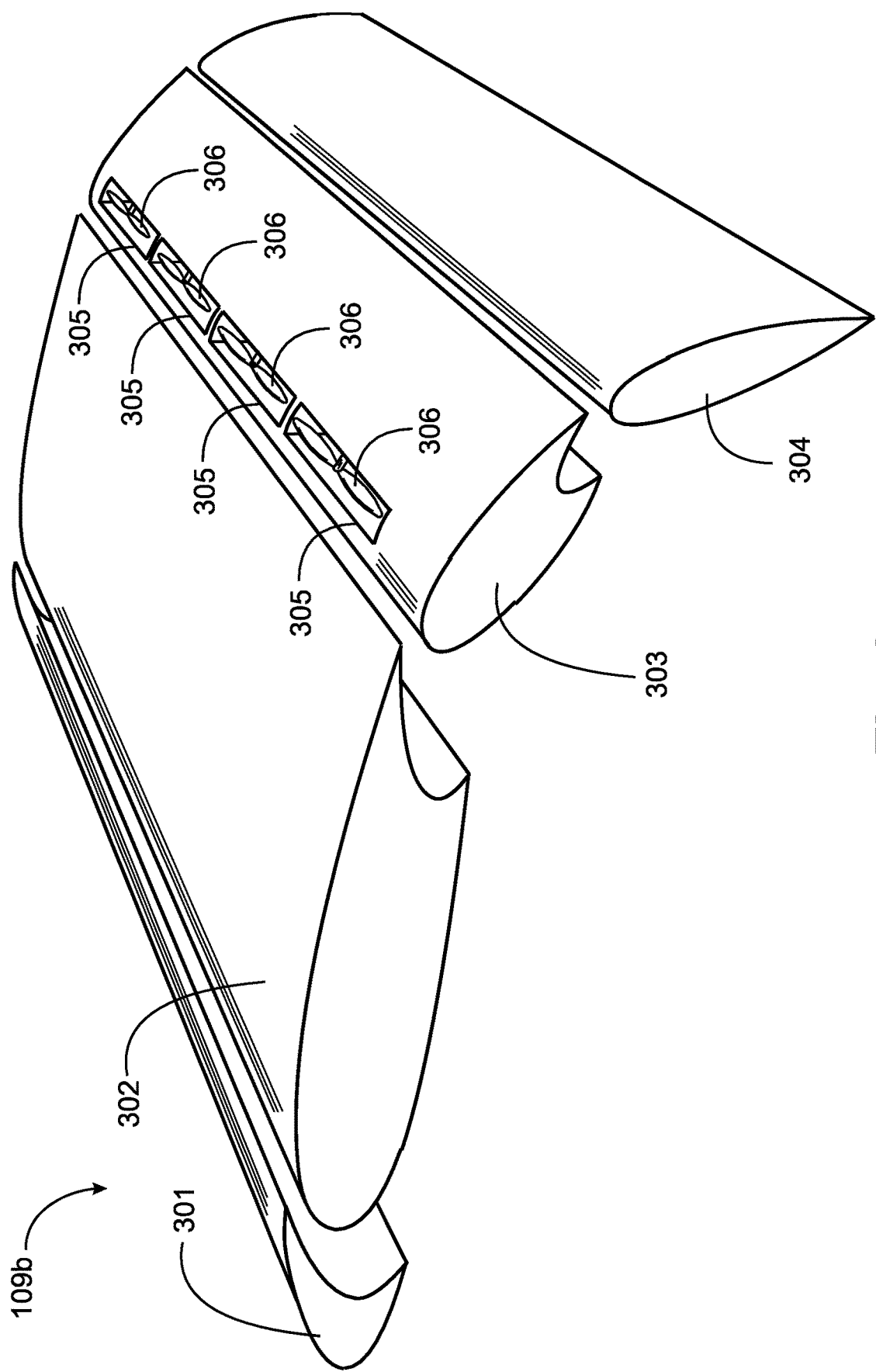
FIG. 3 is a perspective view of a flap system shown extended from a wing of the aircraft of FIG. 1 in an embodiment of the invention.

FIG. 3 is a perspective view of flap system 109b, shown extended from wing 102b of aircraft 101. A flap system in a fixed wing aircraft, if used, is mirrored on each wing on each side, as it is desired to provide even lift on both wings to avoid attitude unbalance. A base portion 301 interfaces with a main portion 302, which interfaces with an enhanced portion 303, which interfaces with a final portion 304. The portions are shown somewhat more separated than in use for purpose of clear illustration. The portions are connected in the operative system and follow a track (not shown) as is known in the art to be extended and retracted. The track is curved to produce the curvature of the connected flap system of main portion 302 and enhanced portion 303 as they extend and retract by a translating system.

The purpose of the extending and retracting flaps is to increase and decrease the overall lift of the wing. As is well-known in the art, as velocity of the aircraft decreases in a landing operation, lift decreases because the velocity of air over the wing also decreases, and at some point, without some means of increasing lift the aircraft will stall. The flaps are the means of increasing lift as velocity drops. Extending the flaps increases wing surface area and curvature, and lift may be controlled up to a point by flap extension and retraction.

There is a limit to additional lift provided by flap extension in conventional systems. At some point in reducing airspeed, lift fails to support the weight of the aircraft, and airspeed may not be reduced further without the aircraft falling. This limitation is critical in landing, as the speed at touchdown together with the mass of the aircraft, cargo and fuel and the efficacy of the braking system determines the length of runway necessary to bring the aircraft to a stop. The idea is to land at the lowest airspeed that may be attained down to the time of touchdown.

Returning to FIG. 3, in an embodiment of the invention portion 303 of the flap system has a plurality of slots 305, each having a propeller 306 driven by an electric motor in a compartment (not shown) in the flap portion also holding a rechargeable battery for driving the propeller when needed. These compartments and the elements within are similar to compartments 201 in FIG. 2. The motors may be any one of many sorts, but in one embodiment brushless DC electric motors are preferred, as these are controllable to stop the two-blade propellers withing the slots.

At some point in extending the flaps in an embodiment of the invention slots 305 are exposed from wing 102b, and coverings of the slots (not shown) may be opened. When the slots are exposed and opened the propellers may be engaged. In this example the propellers are adapted in form and direction of rotation to produce increased volume and velocity of air over the flap portions, particularly portions 303 and 304 in this example. In embodiments of the invention wherein additional propellers are used in slots to increase lift, the propellers are controlled, when used, to spin in opposite directions on each wing, to balance torque produce on the aircraft by direction of rotation. Overall lift is increased and may be maintained greater than overall weight of the aircraft to a substantially lower airspeed than in the conventional art. Slot covers are described below with reference to FIG. 4.

In FIG. 3 it may appear that the propellers in operation may not extend entirely through the flap portion and may not therefore provide airflow under the flap portion. This is of small consequence, however, because it is only airflow and volume over the flap portion that is needed to provide additional lift. The propellers need not be mounted centrally in the flap portion but may be positioned more toward the upper region of the slot. In operation the propellers will extend above the slot, just as is shown for propeller 206 in FIG. 2.

Figure 4A:
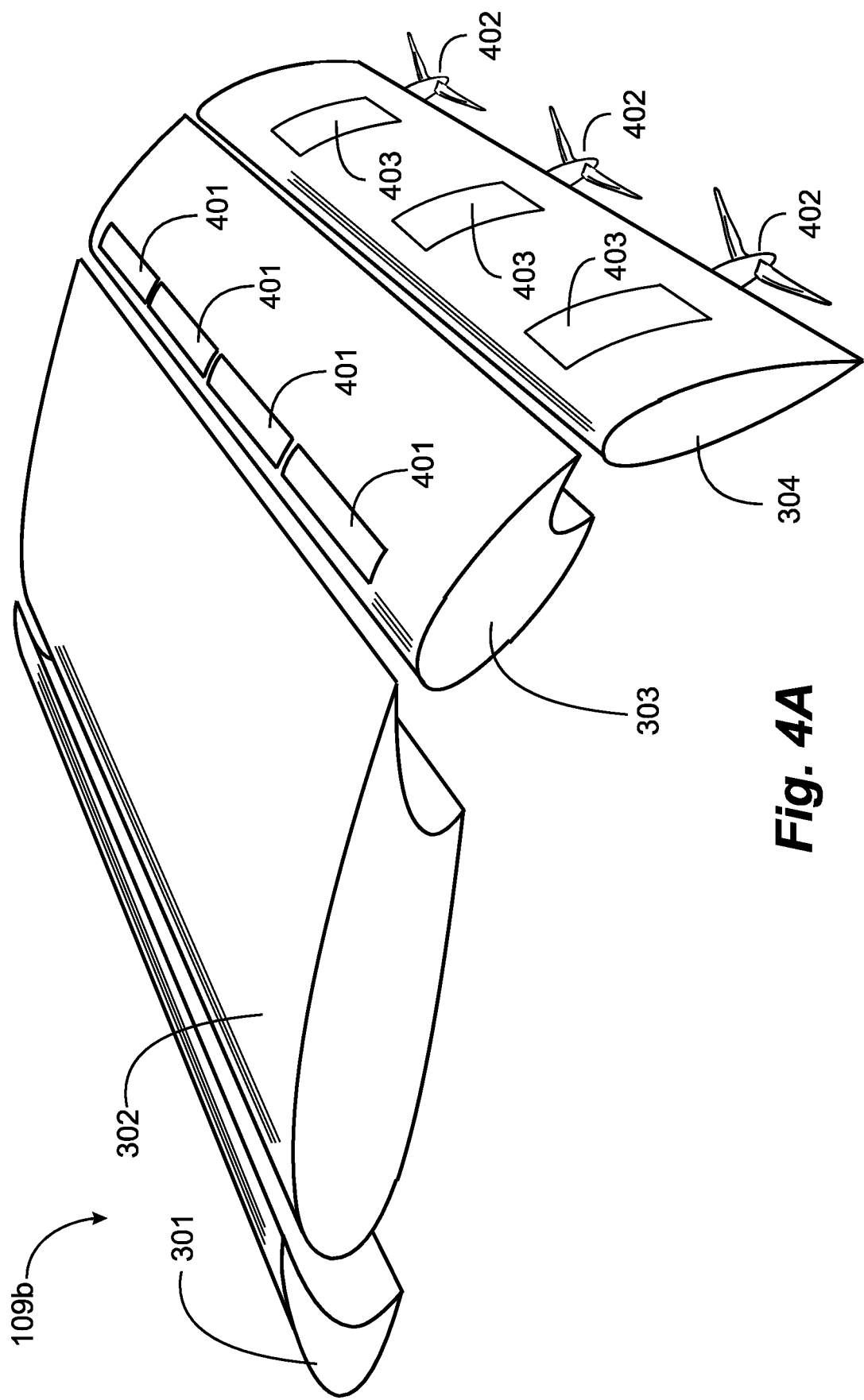
FIG. 4A is a perspective view of a flap system in an alternative embodiment of the invention.

FIG. 4A illustrates a flap system 109b, with a base portion 301, a main portion 302 which interfaces with an enhanced portion 303 with optional propeller covers 401 connected to a final portion 304 in an alternative embodiment of the invention, wherein batteries, electric motors and propellers are incorporated into a final extended portion 304 of the flap system of FIG. 3. In this embodiment there are compartments 403 implemented into portion 304 of the flap system, three in this example, and batteries and electric motors are enclosed much as is shown in FIG. 2 for the aileron embodiment. The skilled person will understand that the assembly and architecture may be different for the embodiment of FIG. 4A, but the components and functions are essentially the same.

In the embodiment of FIG. 4A the battery and motor compartments are shown closed by cover panels, which may be removable to facilitate maintenance and service. Shafts from motors in the compartments are directed outward from the extreme trailing edge of the flap portion, as shown, driving foldable propellers 402, which in one embodiment have three props, two of which may be seen in FIG. 4A, and one of which is hidden because of the angle of the view. The direction of the shafts is along a line bisecting the length of the flap portion. Propellers 402 thus provide thrust in whatever direction the flap is directed. As shown in FIG. 4A, with the flaps fully extended, portion 304 points primarily downward, so thrust provided by propellers 402 is primarily upward, depending on the rotational direction of the propellers.

Also, in FIG. 4A slots in flap portion 303, described above in enabling detail with reference to FIG. 3, are covered with slot covers 401. In embodiments of the invention slots for propellers need to be covered when the propellers are not in use because air leakage through the slots may affect lift and may produce drag. In various embodiments remotely operable covers are provided that may be opened and closed as needed. In one embodiment a cover may be operable on a track to one side of a slot and may be manipulated by a solenoid operated cylinder, or a hydraulic cylinder. There are a variety of ways that slot covers may be implements and operated.

Propellers 402 are folding propellers that, in one embodiment extend, as shown in FIG. 4A, by centripetal force when the motor spins. In another embodiment there are remotely operable mechanisms in the propeller hub to extend and fold the propellers, and the functionality is controlled by commands in a control system described more fully below. In some embodiments the pitch of the propellers is also remotely controllable.

Figure 4C:
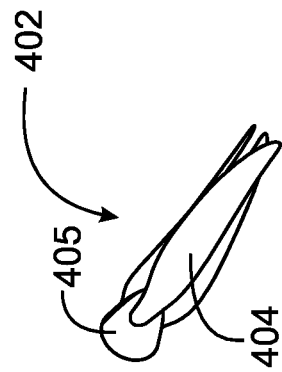
FIG. 4C is a perspective view of propeller 402, folded.
Figure 4B:
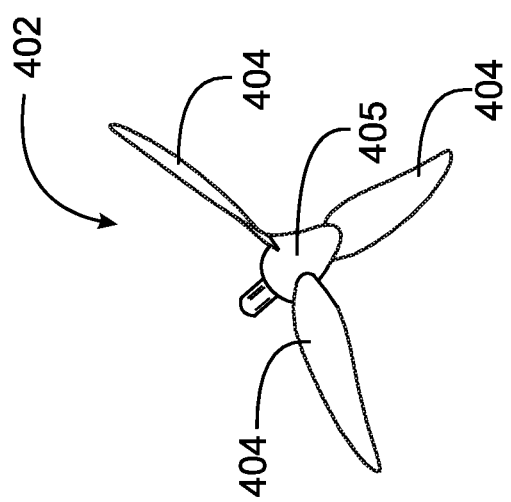
FIG. 4B is a perspective view of propeller 402, extended.

FIG. 4B illustrates one propeller 402 with props 404 powered by engine 405 fully extended. FIG. 4C illustrates one propeller 402 fully folded. In the folded aspect the propellers have very little drag on the aircraft, and with the flaps retracted, the direction of the folded propellers is essentially directly to the rear of the wing.

On takeoff, typically the flaps will be fully extended, and propellers 402 will provide both forward thrust and lift. The action of propellers 402 draws air over the flap sections which also adds to lift. On landing, as flaps are retracted, propellers 402 may be reversed for braking thrust. Given the descriptions above of different embodiments of the invention, there may be a substantial plurality of auxiliary propellers, such as propellers 206, 306, 402, and primary propeller 110. In takeoff and landing procedures any and all of these propellers may be used to provide increased lift or braking as needed by circumstance, and to accomplish these ends, propellers may be reversed in direction, adjustable blades may be used, and speed rpm may be controlled to control thrust as needed.

Figure 5:
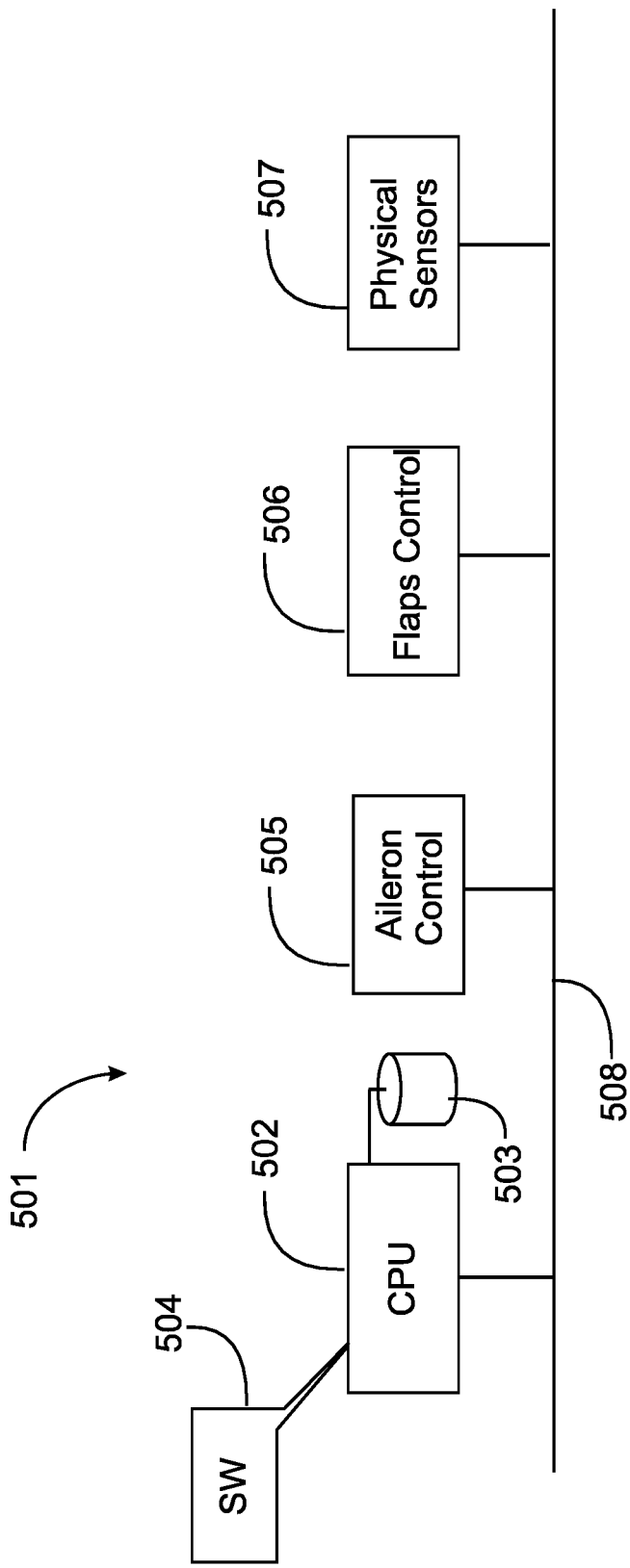
FIG. 5 illustrates a control system in the aircraft of FIG. 1 in an embodiment of the invention.

It will be apparent to the skilled person that apparatus and function enabled in variations of the invention may or may not all be implemented in specific embodiments. That is, aileron systems supplemented with propellers for increasing air volume and speed over the ailerons may be used without enhanced flap systems as described. Enhanced flap systems may be used without the enhanced aileron systems. Apparatus and function described in this specification may be used in aircraft of widely different types, and may be used in different combinations to satisfy different circumstances. FIG. 5 illustrates a control system in aircraft 101 adapted to facilitate control of the elements of the system to perform as a hyper-STOL system, capable of takeoff and landing from, for example, a rooftop or a landing pad of the size of a tennis court.

Control system 501 in this example has a central processing unit (CPU) 502 connected to a local bus 508, which enables the CPU to communicate with other digital devices in the control system. Bus 508 also comprises conductors providing power to the digital devices.

CPU 502 may be one of many well-known digital processors in the art or may be a micro-processor in some embodiments. CPU 502 executes software (SW) 504 in this example and is coupled to a data repository 503 which may store one or more code sequences that may be called and executed in different circumstances in control, and may also store data values that are called in control sequences.

Aileron control 505 in FIG. 5 represents remotely operable elements that are dedicated to functions regarding the left and right aileron systems 108*a* and 108*b*. Among elements involved in aileron control, there are mechanical apparatus that may be commanded by CPU 402 to open and close covers over slots 202. Once slots 202 are open, motor controllers 204 may be commanded by CPU 502 to operate motors 205 to drive propellers 206 in either rotary direction. In some embodiments the propellers may be of a sort that the aspect of the blades may be changed to change the direction and degree of thrust. In some embodiments the angle of flaps 207 may also be controlled under specific circumstances.

Flaps control 506 represents remotely operable elements that are dedicated to functions regarding the left and right flap systems 109*a* and 109*b*. Among elements involved in flap control, there are mechanical apparatus that may be commanded by CPU 502 to open and close covers over slots 305. Once slots 305 are open, motor controllers 204 may be commanded by CPU 502 to operate motors to drive propellers 306 in either rotary direction. In some embodiments the propellers may be of a sort that the aspect of the blades may be changed to change the direction and degree of thrust. In some embodiments the extension and retraction of the flaps may also be controlled, at least in part, by CPU 502.

Physical sensors 507 represents a group of sensors that report important real-time data to CPU 502 for use in control functions. One of the more important data points is airspeed. One or more airspeed sensors are implemented on a surface of the aircraft to report real-time airspeed. Other sensors determine attitude of the aircraft, including roll attitude and attitude of the fuselage. There may be other sensors involved as well. In processes in embodiments of the present invention CPU 502 executes one or more code sequences from data repository 503, and commands physical elements for control of the aircraft according to data provided by sensors.

Although control is described here as mostly automated, manual control of elements in embodiments of the invention is not precluded. Control may in some implementations be entirely automatic, in some entirely automated, and in others a mixture with some functions automated and some accomplished manually.

Referring again to FIG. 1, primary forward propulsion of aircraft 101 is provided by engine 105, which may be an internal combustion engine. In some circumstances functions of engine 105 may be controlled, at least in part, under specific circumstances by CPU 502. Brakes of the aircraft may also, in some circumstances, be controlled, at least in part, by CPU 502.

Figure 6:
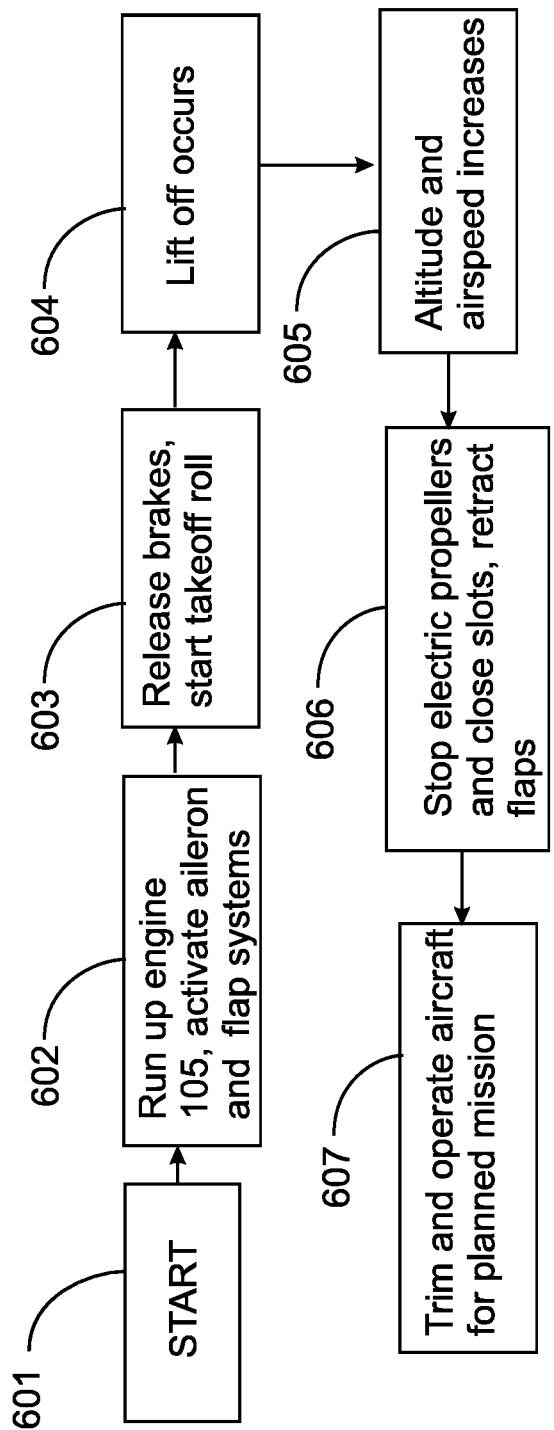
FIG. 6 is a flow diagram representing a takeoff process in one embodiment of the invention.

FIG. 6 is a flow diagram representing a takeoff process in one embodiment of the invention. At step 601 the aircraft may be positioned at a beginning end of a takeoff roll, which for purpose of description, may be a relatively small rooftop, or a small flat area, of the size perhaps of a tennis court. At step 601 the brakes of the aircraft are engaged.

At step 602 power to primary engine 105 is applied to maximum and propeller attitude is set, if adjustable to maximum thrust. Also, at step 602 while the aircraft is still stationary, slots 202 are opened, and propellers 206 are driven to provide additional forward thrust as well as aileron control. Further, the flaps are extended for maximum lift, slots 305 are opened, and propellers 306 are activated and driven to provide maximum lift for the aircraft as well as additional forward thrust in addition to that provided by primary engine 105. Propellers 402 may also be engaged for additional lift and forward thrust for a takeoff roll. At step 603 the brakes are released and the aircraft starts a takeoff roll.

At step 604 liftoff occurs. With the added lift provided by the enhanced flap systems and added thrust provided by all the propellers of the enhanced flap system and the aileron systems the takeoff roll is reduced to a bare minimum. At step 605 altitude and airspeed increase. The electric propellers of the enhanced aileron system and the enhanced flap system may continue to be used for a time to attain desired altitude and airspeed. At step 606 the electric propellers are stopped slots are closed and control reverts to conventional manual and computerized control. At step 607 the aircraft is operated to complete a planned mission up to a landing process.

Figure 7:
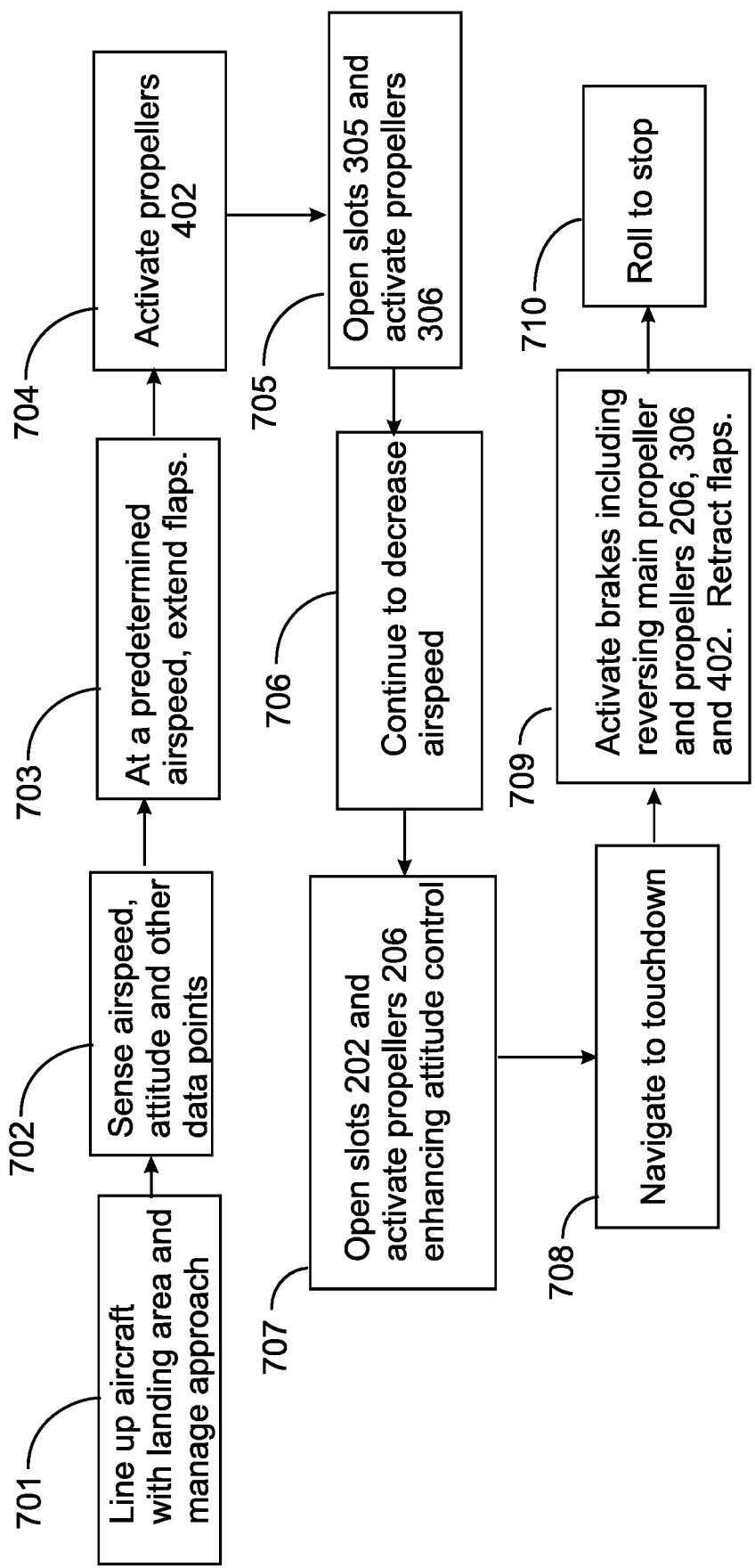
FIG. 7 is a flow diagram illustrating a landing process in an embodiment of the invention.

FIG. 7 is a flow diagram illustrating a landing process in an embodiment of the invention. At step 701 the aircraft is lined up with a landing area which may be, as in the case of the takeoff process, a very small area. At step 702 the system described with reference to FIG. 5 continues to monitor airspeed, attitude, and other aircraft parameters. At step 703, realizing a determined airspeed for the existing conditions, the system extends the flaps for enhanced lift. At step 704 propellers 402 are activated. At step 705 slots 305 are opened and propellers 306 are activated to enhance lift further.

At another point during landing approach, at step 706, airspeed continues to decrease. At a second airspeed at which it is determined that aileron control will be lost, at step 707 slots 202 are opened and propellers 206 are activated providing enhanced control for the ailerons below an airspeed where control would conventionally be lost. At step 708 the aircraft continues to touchdown with both enhanced lift and enhanced control, enabling the airspeed to be reduced to a minimum value at the point of touchdown. Minimum speed at point o touchdown is an important aspect of the present invention, because landing roll is a function of that speed, the mass of the aircraft, and the braking that may be applicable.

At step 709 the brake systems of the aircraft are activated, which may include reversing the main propeller, and one or both sets of propellers 206 and 306, which may be reversed in rotation or blade pitch to provide further reverse thrust. At step 710 the aircraft rolls to a stop in a minimum landing roll. The length of the landing roll may be minimized by the minimum landing airspeed made possible by the increased lift provided by the enhanced flap system.

In the embodiments described above the example is a fixed wing, single engine aircraft. In some embodiments elements and functions of the invention may be applied to aircraft with multiple engines, and other aircraft. In many embodiments the aircraft may be pilotless, such as many unmanned aerial vehicles (UAVs).

The skilled person will understand that the number of slots and propellers that may be provided in a flap system according to an embodiment of the present invention may vary considerably. The power of the brushless electric motors may differ in different embodiments as well. The nature, design and size of the propellers driven by the electric motors in the enhanced aileron and flap systems may vary as well. There are also other electric motors that may be used rather than brushless motors.

The skilled person will understand still further that the elements described in enabling detail in embodiments and implementations above may be combined in a variety of ways in different variations of the invention, all withing the scope of the invention. The scope of the invention is limited only by the scope of the claims.

The invention claimed is:

1. A short take-off and landing (STOL) aircraft, comprising:
   a primary engine for forward thrust;
   an enhanced flap assembly in each wing of the fixed wing aircraft, each flap assembly having a first and a second flap portion rotationally connected, extendable and retractable from an edge of a wing of the aircraft, the flap assemblies increasing and decreasing surface area and altering shape of the wings, each flap assembly further having a compartment within a thickness of the first flap portion, enclosing a rechargeable battery, a motor controller and an electric motor, and a vertically-oriented slot in the first flap portion, the slot having a length substantially greater than a thickness of the first flap portion, with a propeller operable in the slot on a shaft from the electric motor through a sidewall of the slot, such that the propeller in operation extends both over and under the thickness of the flap portion;
   an enhanced aileron system having a first aileron implemented at an outboard end of a first wing of the aircraft, and a second aileron implemented at an outboard end of a second wing of the aircraft, a second compartment in each wing enclosing a second rechargeable battery, a second motor controller and a second electric motor, a vertically oriented second slot in each wing having a length in the direction of a length of the wing, the second slot opening through a thickness of the wing, and proximate the aileron, a propeller rotatable in each wing on a shaft from the second electric motor through a sidewall of the second slot; and
   a digital control system comprising a processor tracking airspeed and attitude of the aircraft through sensors, and executing coded instructions, the control system managing starting and stopping propellers in all the slots in the enhanced flap assembly and the enhanced aileron system according to at least airspeed.

2. The STOL aircraft of claim 1 further comprising a third compartment in each of the second flap portions, the second flap portions being a portion furthest extended when the flap assembly is extended, the third compartments each enclosing a second rechargeable battery, a second motor controller and a second electric motor, the second electric motor driving a propeller shaft directed outward from a trailing edge of the second flap portion, the propeller shaft turning a foldable propeller providing thrust in the direction of extension of the second flap portion.

3. The STOL aircraft of claim 1 wherein the digital control system executes coded instructions controlling a landing sequence, extending the flaps at a first sensed airspeed, activating the propellers in the flap assembly at a second sensed airspeed, and activating the propellers in the enhanced aileron system at a third sensed airspeed.

4. The STOL aircraft of claim 2 wherein the digital control system executes coded instructions controlling a landing sequence, extending the flaps at a first sensed airspeed, activating the propellers in the flap assembly at a second sensed airspeed, and activating the propellers in the enhanced aileron system at a third sensed airspeed.

5. The STOL aircraft of claim 1 wherein the digital control system further senses touchdown in the landing sequence and activates a braking system in the aircraft on touchdown.

6. The STOL aircraft of claim 2 wherein the digital control system further senses touchdown in the landing sequence and activates a braking system in the aircraft on touchdown.

7. The STOL aircraft of claim 5 wherein the braking system comprises one or both of reversing thrust of the propellers in the enhanced flap assembly, the propellers in the enhanced aileron system, and a propeller of a primary engine of the aircraft.

8. The STOL aircraft of claim 6 wherein the braking system comprises one or both of reversing thrust of the propellers in the enhanced flap assembly, the propellers in the enhanced aileron system, and a propeller of a primary engine of the aircraft.

9. The STOL aircraft of claim 1 further comprising remotely operable covers on the slots of both the enhanced flap assembly and the enhanced aileron system, wherein the digital control system opens and closes the covers as needed in managing operation of propellers.

10. The STOL aircraft of claim 1 wherein the digital control system executes coded instructions controlling a takeoff sequence, beginning with brakes locked, running up the primary engine to maximum thrust, extending the flaps of the enhanced flap assembly, activating the propellers in the flaps increasing forward thrust and adding lift, activating the propellers in the enhanced aileron system adding thrust and enhancing attitude control, releasing the brakes, sensing airspeed during takeoff roll, sensing liftoff, and sensing altitude and airspeed after liftoff, deactivating propellers in the enhanced flap system and enhanced aileron system at some combination of altitude and airspeed, and retracting the flaps, attaining a cruising altitude and airspeed.

11. The STOL aircraft of claim 1 wherein the digital control system executes coded instructions controlling a landing sequence, beginning with the aircraft lined up for landing and decreasing airspeed, extending the flaps at an airspeed before stall is sensed, activating the propellers in the flaps adding lift, activating the propellers in the enhanced aileron system enhancing attitude control, sensing touchdown, activating mechanical brakes after touchdown, reversing thrust by one or all of propellers of the primary engine, the enhanced flap assembly and the enhanced aileron system, decreasing ground speed to final stop.

* * * * *